April 7, 1953 P. M. UNTERWEISER 2,633,969
INDICATING DEVICE FOR TYPEWRITERS AND THE LIKE
Filed Nov. 13, 1950

INVENTOR.
PAUL M. UNTERWEISER
BY
William E. Fears
ATTORNEY

Patented Apr. 7, 1953

2,633,969

UNITED STATES PATENT OFFICE 2,633,969

INDICATING DEVICE FOR TYPEWRITERS AND THE LIKE

Paul M. Unterweiser, New York, N. Y.

Application November 13, 1950, Serial No. 195,441

10 Claims. (Cl. 197—189)

The present invention relates to indicators employed on typewriters, billing machines and the like, and more particularly to a novel and improved indicator for indicating the progression and the end of progression of a page item through a typewriter platen mechanism.

It is well known that various devices have been employed for indicating the progression, i. e., length of travel, of a sheet of paper or a card through a typewriter, billing machine and the like. The prior art devices employed heretofore have been designed and based principally upon the worm screw principle, the helix principle, or other complicated means for actuating the indicator mechanism. These mechanisms are difficult to operate, are expensive to manufacture, and are generally cumbersome. In using the prior art devices, once the device has been employed for measuring the progression of an entire sheet or predetermined part of a sheet of paper through a typewriter, the device must be re-set by resetting the indicating weight, pointer or the like back to a position at the extreme starting point of the worm screw, helix or the like. These prior art arrangements have, of course, offered difficulties which make the operation of the prior art devices cumbersome. The industry has been confronted with the need for an indicator for indicating the progression of a sheet item through a typewriter and the like, which is easily and quickly set and actuated, which is easily and conveniently manufactured for any type and size of machine to which it is attached, and which is easily and quickly installed and operated. Although many attempts were made to overcome the foregoing difficulties and disadvantages, none, as far as I am aware, was entirely successful when carried into practice commercially on an industrial scale.

I have invented an indicator which is easily and inexpensively manufactured, which is easily and quickly attached to any standard typewriter or the like, and which has the facility of being operated with ease and simplicity.

It is an object of the present invention to provide an indicating device, for measuring the length of travel of a page item through a typewriter or the like, which is cheaply and easily manufactured.

Another object of the invention is to provide a simple indicating device which is easily attached to any typewriter, billing machine and the like without altering the device or any part of the machine to which it is attached.

The invention also contemplates providing a page length travel indicator, for use on typewriters and the like, which is easily employed by the operator, and which does not require resetting of the mechanical actuating mechanism after each instance of use.

It is a further object of the invention to provide a sheet progression indicator which is manipulated at the starting point setting with facility, ease, and comfort to the operator of the indicating device.

The invention further contemplates providing a sheet length of travel indicator for use on typewriters wherein the indicating mechanism does not provide any substantial or substantially measurable frictional resistance or mechanical resistance to the "free" actuating movement of the mechanically moving parts of the typewriter.

It is another object of the invention to provide an indicating device for attachment to typewriters and the like to indicate the page end of the sheet of paper passing through the platen and through the mechanism of a typewriter.

Still another object of the invention is to provide a simple indicating device for measuring the progression of a sheet item through a typewriter, which does not require a mechanically connected transmitting means between the platen and the actuating parts of the indicating device.

It is also an object of the invention to provide an indicating device for indicating the actual progression of a sheet item through a typewriter mechanism wherein the actual pointer of the indicator clearly and distinctly marks the position on a scale, and is easily readable at eye level of the operator.

Other objects and advantages will become apparent from the following description taken in conjunction with the accompanying drawing in which.

Figure 1:
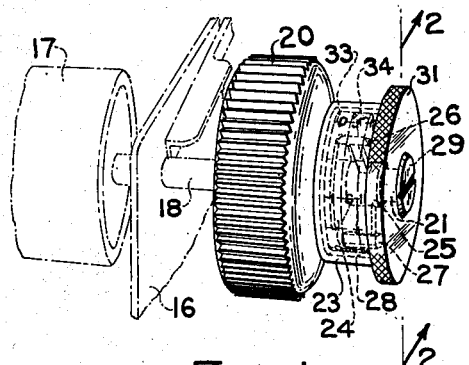
Figure 1 is a perspective view of the principal embodiment of the invention as applied to the platen knob of a typewriter.
Figure 2:
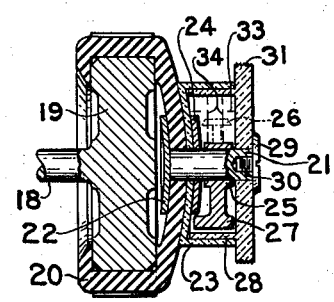
Figure 2 depicts a longitudinal sectional view of the device shown in Figure 1.
Figure 3:
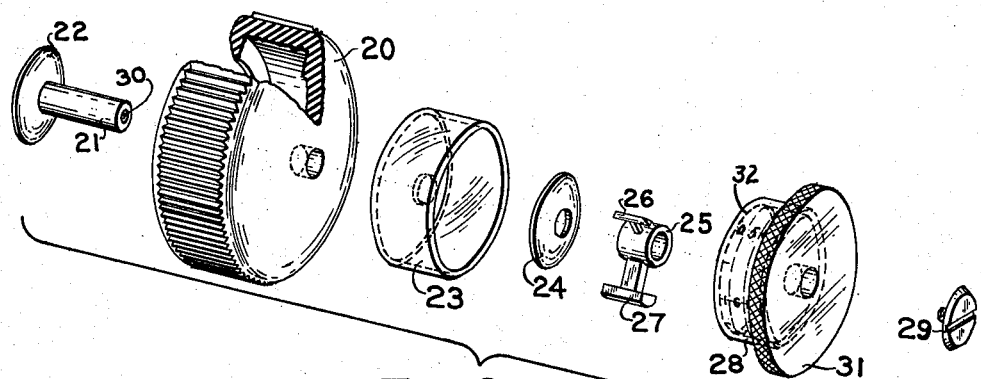
Figure 3 shows an exploded view of the parts forming the principal actuating parts of the principal embodiment of the invention.

Generally speaking, the present invention contemplates an indicating means for attachment to the platen of a typewriting machine, billing machine and the like comprising a hollow transparent cylindrical enclosure rotatable with the platen of the typing machine, said hollow enclosure being assembled of at least two transparent cylindrical members circumferentially and frictionally coupled together to provide said hollow transparent cylindrical enclosure. At least one of the transparent cylindrical members is rotatable against the frictional resistance of the circumferential contact with the other cylindrical member and is rotatable independently of the platen, whereas the other cylindrical member is rigidly attached to the platen and is not rotatable independently of the platen. The hollow transparent cylindrical enclosure or casing is adapted to retain a shaft therethrough along substantially the cylindrical axis of the hollow enclosure and the two transparent cylindrical members which provide the hollow enclosure, said shaft being adapted to rotate with the rotation of the typewriter platen. The shaft is also adapted to retain a freely rotatable weighted pointer thereon, said pointer being adapted so that the weight of the weighted pointer mechanism maintains the pointer in a stationary position as the platen and shaft are rotated. The hollow transparent cylindrical enclosure has a scale thereon which is rigidly fixed to the cylindrical enclosure and rotates with the platen and the shaft when the indicating device is set for operation. The scale is fixed only to the transparent cylindrical member which is rotatable against the frictional resistance of the other cylindrical member, and adapted for rotation independently of the platen of the typewriter.

Now specifically referring to the drawings, I have illustrated my invention as applied to a typewriter, but it can be applied to billing machines and the like. The reference numeral 16 represents a typewriter having thereon a conventional platen 17, the latter being mounted on the platen shaft 18 for rotation progressively as the typing operation proceeds. The shaft 18 has attached thereto at its end a knurled knob 19 which is generally gripped by the typist to rotate platen 17 and to adjust the sheet of paper (not shown), card and the like in the platen of the machine for the start of typing operations.

My inventive indicating means is illustrated in Figs. 1 through 5 inclusive as a means for measuring the progression of a sheet of paper or the like through the machine and around the platen. Moreover, the indicating means shows the typist the actual number of inches or the like remaining of the sheet before the typist reaches a predetermined point on the sheet or the like. As illustrated in Figs. 1-4 inclusive, the principal embodiment of the indicating device is readily and easily attached and detached with respect to the platen knob of a typewriter.

Figure 4:
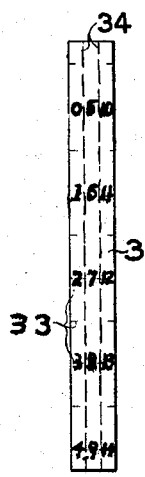
Figure 4 illustrates the flexible and removable scale for insertion within the mechanism illustrated above.

Specifically, the principal embodiment of the invention comprises a flexible gripping means depicted by numeral 20 which is adapted to frictionally grip platen knob 19 when 20 is fastened thereover. The gripping means 20 may be made of rubber, plastic or the like. Gripping means 20 is rigidly attached at one end to a shaft 21 which is adapted to be attached to the gripping means 20 by a flange 22. Shaft 21 passes through a base portion of a transparent hollow cylindrical cup 23, shown herein as the female cup, whose base rests against the gripping means 20 and is rigidly compressed thereto by a force flange 24. This mechanical arrangement of parts 20, 21, 22, 23 and 24 provides a connection so that all these named parts are rigidly connected together and will rigidly rotate with the platen knob 19 when the indicating device is fixed upon knob 19 by fitting the gripping means 20 over the knob 19. Shaft 21 is so adapted that it passes through the fulcrum of a weighted pointer mechanism 25 so that the weighted pointer mechanism 25 is freely rotatable about shaft 21. The weighted pointer mechanism 25 consists of a pointer 26 and a weight 27 so arranged that the weight 27 will retain the pointer mechanism in one position by force of gravity as the shaft 21 is rotated. Pointer 26 is so arranged with respect to the weight 27 that the pointer 26 will always point towards the typist at substantially eye level. Shaft 21 passes through the end portion of the other transparent cylindrical member 28, shown as a male fitting cup, and member 28 is adapted for circumferential frictional fitting within cylindrical transparent member 23. A threaded flanged cap 29 is adapted for threading into the threaded end portion 30 of shaft 21 so as to frictionally compress the transparent circumferential members 23 and 28 together to provide frictional resistance against rotation of one with respect to the other. Member 28 is rotatable by force about shaft 21, but is resisted by frictional force against rotation with respect to member 23. The transparent member 28 has a knurled knob portion 31 thereon for ease of rotation when the operator desires to set the indicating device for operation. Affixed rigidly to the circumferential surface of the transparent member 28 is a scale 32 which is preferred as a removable flexible scale as shown in Fig. 4, adapted to be formed and fitted around the circumferential surface of transparent member 28; however, the scale markings may be engraved directly on the circumferential surface of member 28. The scale 32 is so made that a series of lateral markings 33 are placed thereon at positions to correspond to number of inches or the like which the scale travels with respect to the rotation of the hollow transparent members 23 and 28 and platen 17. The scale also has a series of vertical markings 34 thereon to separate the scale into divisions for reading the scale as the platen 17 is rotated past 360 degrees of rotation. Most typewriter platens have circumferences of 4⅔ inches and 5 inches. Accordingly, the lateral scale markings 33 will be marked off in inches in an appropriate ratio according to the actual circumference of the platen. For example, the scale 32 has been marked off vertically for five inches in lengths as 0, 1, 2, 3, and 4 inches in the first 360 degrees of rotation of the platen 17 and the corresponding rotation of the hollow member 28. The second vertical column discloses markings of 5, 6, 7, 8, and 9 inches for the next 360 degrees revolution of the platen, and finally 11, 12, 13, 14 and up to zero again to be read as 15 inches for three 360 degrees of rotation of the platen, and corresponding member 28. Obviously one skilled in the art can measure the typewriter platen employed and manufacture a corresponding scale 32 which will correspond to the measurement of the platen circumference and will designate the inches of travel of the platen through one or more revolutions.

To describe the actual operation of the indicating device, a typist simply attaches the gripping means 20 to the platen knob 19 of a typewriter, the device being assembled so that the scale 32 has markings thereon equivalent to the typewriter platen circumference. For example, a platen having a circumference of 5 inches is employed and a scale marked from 0 to 5 inches for one revolution is shaped and inserted within the member 28. The paper sheet (not shown) is placed within the typewriter and around the platen and set at a predetermined position. The transparent member 28 having the scale 32 thereon is then rotated against the frictional resistance provided by the frictional couple with member 23 to a position so that the scale mark 0 is set at the pointer 26 and read at the extreme left-hand end of the pointer. Once the scale is set at the pointer the typist proceeds to operate the machine. As the paper progresses through the platen mechanism the entire hollow indicator device, made of members 23 and 28 being assembled together as described hereinbefore, rotates cooperatively and synchronously with the platen 17. The weighted pointer mechanism 25 being freely rotatable about shaft 21, and being held in a stationary position by force of gravity on weight 27, remains in position while the hollow assembly carrying the scale 32 rotates synchronously with the platen 17 about the stationary pointer mechanism 25. In this manner the scale 32 passes about the pointer 26 so that for the first inch of travel of the platen 17, and the paper sheet carried thereon, the pointer will be at a position with respect to the scale so that the scale is read at the pointer 26 on the lateral markings of scale 32 as the numbers 1, 6, and 11 inches, and is read by the typist at the extreme left-hand end of the pointer in the left-hand vertical column of the scale as 1 (meaning one inch of travel of the platen and the paper sheet or the like). The next inch of travel of the platen will be read in the left-hand column of the scale 32 at the number 2 for two inches of travel, and so on up to the number 5 for 360 degrees of rotation. After platen 17 and the transparent member 28 with the scale 32 thereon have rotated 360 degrees the typist continues to read the scale in the second vertical column at the middle of the pointer 26 for 6, 7, 8, etc. inches of travel of the platen. After the second 360 degrees of rotation of the platen 17 the scale 32 is read in the right-hand vertical column at the right-hand end of pointer 26 for 11, 12, 13, etc. inches of travel of the platen, and thus the travel of the paper sheet.

In the employment of the inventive device the typist can set the transparent member 28, and the corresponding scale 32 at any desired number for a predetermined starting point, and can accurately determine at a glance at the pointer 26 and the scale 32 how far the paper has progressed through the platen. For example, if the sheet of paper is ten inches in length and the typist desires to start at a position two inches from the top of the sheet, the typist simply sets the sheet at two inches above the platen marker (not shown) on the typewriter, and sets the scale 32 at the pointer 26 opposite the scale marker 2, read in the left-hand column of scale 32. This position indicates that two inches of paper have been fed into the platen to provide a two-inch margin, and the typist will start at 2 inches on the scale. The typist then proceeds to type and can read the scale 32 at a glance as it rotates about the pointer 26 so that the inches of paper progressing through the machine can be seen on the scale at any moment. If the typist wishes, for example, a margin of two inches at the bottom of the sheet, the typist simply operates the machine until the scale has rotated 360 degrees up to the number 6, read in the central vertical column of scale 32. This reading would obviously mean that a total of six inches of paper have been fed through the machine and typed upon. If the typist stops typing at the number 6 a bottom margin of two inches will remain on the sheet of paper passing through the machine.

Figure 5:
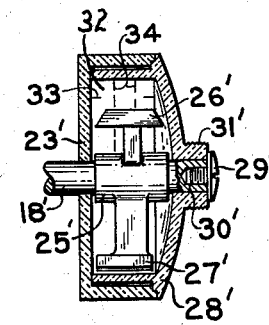
Figure 5 is another embodiment of the invention for direct and permanent assembly on a typewriter.

Fig. 5 illustrates a modification of the principal invention as applied in the actual manufacture of a typewriter, with the indicator device attached directly to the platen shaft 18'. In this modification the hollow transparent member 23' and the hollow transparent member 28' are frictionally and circumferentially assembled together on platen shaft 18', member 23' being rigidly attached to shaft 18' so as not to rotate thereabout, but member 28' is mounted so as to be rotatable about shaft 18'. The hollow transparent member 28' has a knurled knob portion 31' thereon to facilitate rotation of 28' about shaft 18' when the operator sets the scale 32 at the desired position opposite point 26'. The indicating device has a weighted pointer 25' freely rotatable about shaft 18' in the same manner as described in the principal embodiment of the invention, and a scale 32 attached to transparent member 28' in the same manner as the principal embodiment. The members 23' and 28' and the weighted pointer 25' are assembled and retained on the shaft 18' by a threaded cap 29' threaded into the threaded end of shaft 18' as at 30'. This arrangement provides ease of removal and insertion of scale 32, for various types of platens and machines. However, the shaft 18' may be permanently flanged to retain the entire assembly upon shaft 18', if a manufacturer so desires for a particular machine, and the threaded cap 29' and the threaded portion 30' of shaft 18' may be dispensed with by flanging the shaft 18' at the end to retain the indicator assembly thereon.

The hollow members 23, i. e. female cup, and 28, i. e. male cup, may be made of any transparent plastic material, glass, etc., and the pointer mechanism 25 may be made of aluminum or aluminum alloys, stainless steel, brass, etc. The removable transparent scale 32 may be made of any transparent flexible thermoplastic, cellulose tape, etc.

It is to be observed that the present invention provides a simple indicating device which is easily manufactured, which is easily attached to and detached from any typewriter or the like, which is easily operated by any operator, and which is easily read with substantial accuracy.

Furthermore, the invention provides a page-length progression indicator for attachment to typewriters and the like, which does not require re-setting of the mechanical actuating mechanism after each instance of use.

Moreover, the invention provides an indicating device for attachment to typewriters and the like to indicate the page end of a sheet of paper around the platen and through the mechanism of a typewriter.

The invention also provides an indicating device wherein the indicating device does not offer any substantial frictional force or mechanical force against the "free" operation of the actual typewriter or the like to which the device is attached.

Finally, the invention provides an indicating device for measuring the progression of a typewriter platen and the like, wherein the mechanical actuating parts of the device do not require a mechanical transmitting connection between the actuating parts of the device and the actuating parts of the typewriter or the like.

Although the present invention has been described in conjunction with the preferred and modified embodiments, it is to be understood that modifications and variations may be resorted to without departing from the spirit and scope of the invention, as those skilled in the art will readily understand. Such modifications and variations are considered to be within the purview and scope of the invention and the appended claims.

I claim:

1. An indicating device for attachment to typing machines, billing machines and the like for measuring the progression of a sheet of paper or the like and the page end, said device being attachable to a rotative platen of the typing machine, comprising a substantially hollow transparent enclosure having a transparent scale rigidly affixed to said hollow transparent enclosure, rotatable with the platen, said hollow enclosure having a shaft disposed therein along substantially the rotational axis of said hollow enclosure, said shaft supporting a freely rotatable weighted pointer thereon, said weighted pointer being adapted to remain stationary by force of gravity as said hollow enclosure is rotated about its axis and about the weighted pointer, and adapted so that the weighted pointer is visible through the scale of said hollow transparent enclosure.

2. An indicating device for measuring the progression of the platen of a typewriter and the like, said device comprising a substantially hollow transparent enclosure member composed of at least two cup-shaped transparent sections frictionally coupled together so that at least one cup-shaped section is rotatable with respect to the other cup-shaped section, said other cup-shaped section being adapted for frictional attachment to the platen and being synchronously rotatable therewith, said one cup-shaped section being rotatable independently of the typewriter platen and having a transparent scale rigidly affixed thereto corresponding to the circumference of said platen, said substantially hollow transparent enclosure member having a shaft therethrough substantially along the rotational axis of each cup-shaped section, said shaft having a freely rotatable weighted pointer disposed thereon within said hollow transparent enclosure member, said weighted pointer adapted to remain substantially stationary by force of gravity as said hollow transparent enclosure member is rotated with the platen about said weighted pointer, said weighted pointer being visible through said transparent scale affixed to the cup-shaped member which is rotatable independently of the typewriter platen.

3. An indicating means for the platen of a typing machine and the like, comprising a cylindrical transparent member rotatable with the platen and composed of two cup-shaped transparent sections, at least one cup-shaped member being rigidly rotatable synchronously with the platen, and the other cup-shaped member being frictionally coupled with the first cup-shaped member and adapted for independent rotation with respect to the platen, a shaft extending through the cylindrical transparent member, and an indicating weighted pointer member disposed within the cylindrical transparent member on said shaft and adapted to rotate freely about said shaft and to remain stationary by force of gravity as the cylindrical transparent member is rotated synchronously with the platen.

4. In an indicator attachment for the platen of typing machines, the combination of means for fastening the attachment to synchronously rotate with the platen, a cylindrical transparent member composed of two frictionally coupled cup-shaped sections adapted to rotate synchronously with the platen and at least one cup-shaped section having a transparent scale thereon adapted to rotate independently of the platen against frictional force of the coupling, and an indicator weighted pointer means disposed within said cylindrical transparent member and adapted to rotate freely within said cylindrical transparent member by force of gravity, said indicator weighted pointer means being adapted to point to said transparent scale.

5. In an indicator attachment for the platen of typing machines, the combination of means for fastening the attachment to rotate with the platen, a cylindrical transparent hollow member rotatable with the platen and composed of two cup-shaped sections, at least one section having a transparent scale thereon being adapted for independent rotation with respect to the platen and the other cup-shaped section, and a weighted pointer disposed within said transparent hollow member and adapted to rotate freely within said hollow member and to remain stationary by force of gravity, said weighted pointer being adapted to cooperate with said scale for indication of rotation of said hollow transparent member and the platen.

6. An indicating means for the platen of a typing machine comprising a cylindrical hollow transparent member rotatable synchronously with the platen and composed of two cup-shaped transparent sections, at least one section being rotatable by external force independently of the platen, a weighted pointer disposed within said hollow transparent member and adapted to rotate freely therein and remain stationary by force of gravity, and a transparent indicating scale affixed to the independently rotatable cup-shaped section, the weighted pointer being exteriorly visible through said indicating scale.

7. An indicating device for attachment to typing machines, billing machines and the like for measuring the progression and page end of a sheet of paper and the like passing through said machine, said device having a flexible, frictional attachment means for attachment to a rotative platen of the typing machine, comprising a substantially hollow transparent casing composed of two frictionally coupled transparent opposing cup-shaped members, at least one cup-shaped member being rigidly attached to said frictional attachment means so as to rotate synchronously with the typewriter platen, the other cup-shaped member having a transparent scale affixed to its circumferential surface and being rotatable independently of the platen and said one cup-shaped member against the frictional force of the coupling, a shaft rigidly affixed through the axis of the frictional attachment means and the rigidly attached cup-shaped member so as to rotate synchronously with the platen, the shaft passing through the cylindrical axis of said other cup-shaped member and having a weighted pointer member disposed thereon within the transparent casing, said independently rotatable cup-shaped member being independently rotatable about said shaft, and said weighted pointer member being freely rotatable about said shaft, the weighted pointer member being visible through the transparent casing and the scale affixed thereto.

8. A page progression indicator for attachment to the platen of typewriters and the like, comprising a cylindrical casing having a visual means through the circumferential surface thereof, said casing being composed of at least two opposing cup-shaped sections frictionally coupled together, at least one of these sections being rigidly and synchronously rotatable with the platen, the other section having a scale thereon and being rotatable independently of the platen, and a shaft disposed along substantially the cylindrical axis of said cylindrical casing and having a weighted pointer freely rotatable thereon and disposed within the cylindrical casing, said weighted pointer being visible through the circumferential surface of said cylindrical casing.

9. A page progression indicator attachment of the character set forth in claim 8, wherein the weighted pointer is formed of a vertically suspended weight integral with a protruding pointer having an exterior point positioned at an obtuse angle with respect to the weight and adapted to be viewed at substantially eye level.

10. A page progression indicator attachment of the character set forth in claim 8 wherein the cup-shaped sections are formed for peripheral engagement.

PAUL M. UNTERWEISER.

REFERENCES CITED

The following references are of record in the file of this patent:

UNITED STATES PATENTS

| Number | Name | Date |
| --- | --- | --- |
| 1,757,541 | Murdock | May 6, 1930 |
| 2,505,769 | Hassell, Jr. | May 2, 1950 |